United States Patent Office 3,355,909
Patented Dec. 5, 1967

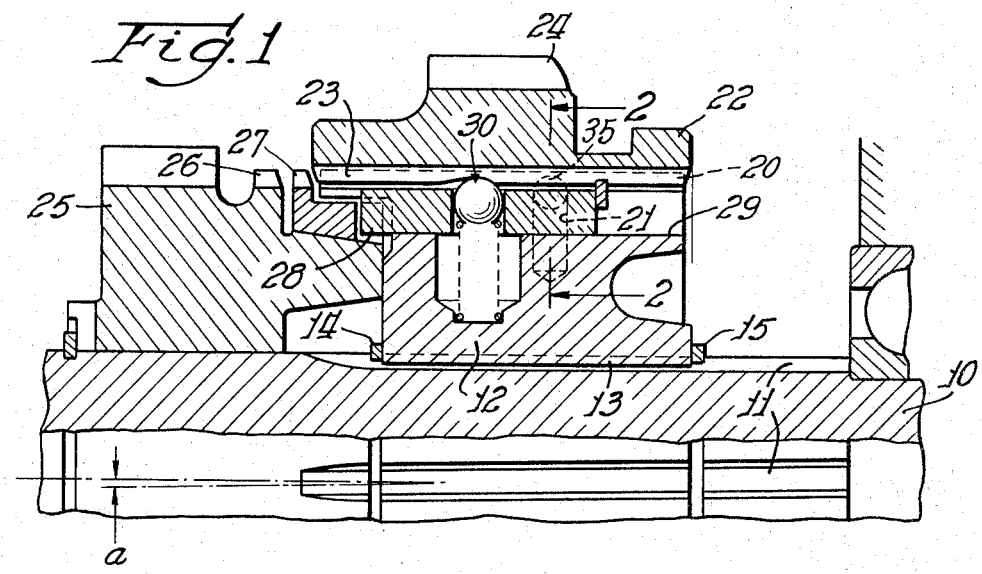
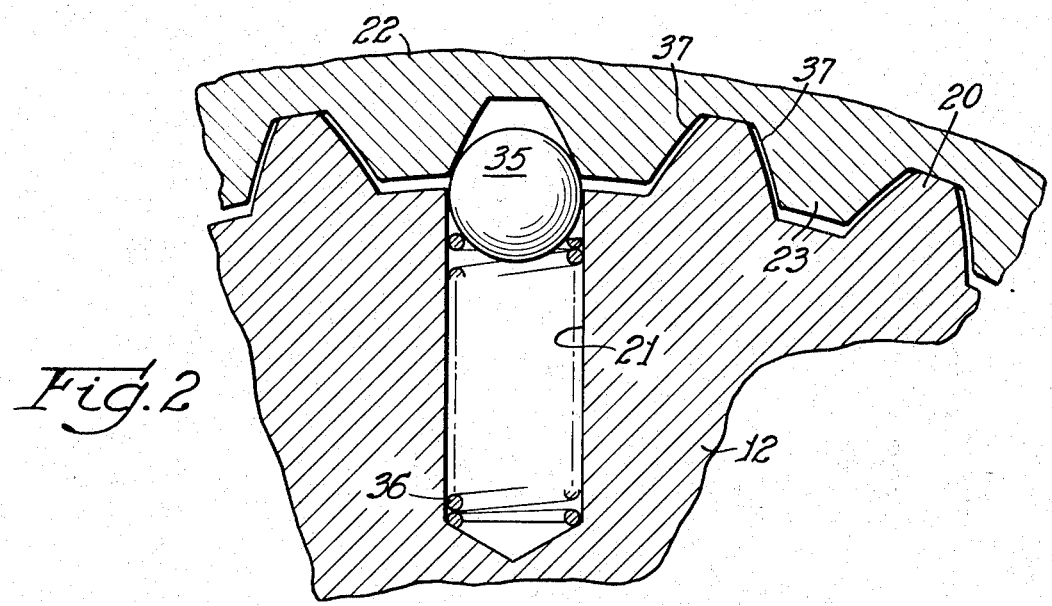

3,355,909
ANTI-RATTLE DEVICE FOR A TORQUE
TRANSMITTING MECHANISM
Edward S. Russey and Emmett B. Duncan, Muncie, Ind.,
assignors to Borg-Warner Corporation, Chicago, Ill.,
a corporation of Illinois
Filed Oct. 18, 1965, Ser. No. 497,398
3 Claims. (Cl. 64—6)

ABSTRACT OF THE DISCLOSURE

A torque transmitting mechanism comprising two rotatable parts splined together including a spring-urged ball on one of the parts engaged between the splines on the other part to center the splines of one part with respect to the other to prevent relative oscillation and noise when said mechanism is not transmitting torque.

---

This invention relates to an anti-rattle device for splined gear and shaft connections.

More particularly this invention relates to a device in which two rotary parts have a splined driving connection therebetween and wherein oscillation of one part with respect to the other, while the parts are under a "no load" condition, is prevented.

Accordingly, it is an object of this invention to provide a mechanism including two torque transmitting parts having a splined driving connection therebetween wherein a means is yieldably urged into engagement with the splines on one of said parts to center one of said parts with respect to the other and thereby prevent relative oscillations of one part with respect to another and eliminate noise.

It is a further object of this invention to provide an improved form of a splined connection between two torque transmitting parts wherein by use of one part having straight splines and the other part having splines with a slight helix angle, relative oscillating movement or backlash between said two parts is prevented.

These and other objects of the invention will become more fully apparent as reference is had to the accompanying drawings wherein:

FIGURE 1 is a cross section of a synchronizer and torque transmitting mechanism embodying the principles of the invention; and FIGURE 2 is a view taken along the line 2—2 of FIGURE 1.

Referring now to the drawings and particularly to FIGURE 1, there is shown a portion of a transmission having a torque transmitting shaft 10 having external splines 11 thereon. A hub member 12 having internal splines 13 is assembled over the splines 11 on shaft 10 and is held in place by snap rings 14 and 15. Hub 12 also has external splines 20 thereon and has a series of bores therein numbered 21 of which there may be three equally spaced around the hub although only one is illustrated in FIGURE 2.

An axially slidable gear 22 encircles the hub 12 and has internal spline teeth 23 therein enmeshed with spline teeth 20 on hub 12. Splines 20 and 23 provide a torque transmitting connection between the axially slidable member or gear 22 and hub 12. Gear 22 has external gear teeth 24 thereon.

A gear 25 is journalled on the shaft 10 and is adapted to be drivingly connected to the shaft 10 when the gear 22 is moved to the left to engage external teeth 26 provided on the gear 25. A known form of synchronizer structure is used as illustrated in FIGURE 1 to provide for synchronization of the gear 25 prior to engagement of the positive clutch teeth 26 by internal splines 23 in gear 22. The synchronizer structure includes a blocking ring 27; thrust elements 28 mounted in slots 29 in hub 12, and a detent mechanism 30.

Operation of the synchronizing structure for drivingly connecting gear 25 to shaft 10 is well known and reference may be had to White et al. Patent No. 2,221,900 for a complete description of the operation thereof.

In FIGURE 2 the novel and improved mechanism for preventing rattle is illustrated. As above described a series of radially extending bores 21 which in a preferred embodiment would comprise three equally spaced around the circumference of the hub 12 are provided. Within each of the bores 21 a ball 35 is mounted, the ball being urged radially outwardly by coil spring 36 mounted within the bore 21.

When a splined connection is made between two parts as for example the splines 20 on hub 12 and splines 23 on gear 22 a certain amount of clearance must be allowed between the teeth of the members to allow for manufacturing tolerances and ensure that the parts can be assembled. This clearance as indicated at 37 in FIGURE 2 is responsible for the rattle or blacklash which can occur between splined parts when they are rotating in a "no load" condition.

The improved mechanism 21-35-36 eliminates noise and backlash in a simple and effective manner in that the spring 36 urges balls 35 radially outwardly and the balls 35 engage within the grooves between the splined teeth 23 of the gear 22. Since the teeth 22 are of uniform shape and design engagement of the ball 35 between the teeth 23 centers the teeth 23 with respect to the teeth 20 in an arcuate sense to provide for equalization of the clearance 37 on either side of the teeth 20 as has been illustrated in FIGURE 2. The rate of the springs 36 is such that the gear 22 will be centered with respect to hub 12 with sufficient force to prevent oscillation of the gear 22 with respect to the hub 12 when the parts are rotating under "no load" conditions.

In addition, backlash or oscillation between the hub 12 and shaft 10 is also eliminated by the improved splines 11. The splines 11 on shaft 10 are formed with a slight helix angle preferably of an extent less than one degree as indicated by $a$ in FIGURE 1. The hub 12 has straight splines 13 having a zero helix angle. Therefore, when the hub 12 is assembled over shaft 10 with splines 13 and 11 enmeshed the helix angle on the splines 11 ensures a tight engagement and will prevent any clearance from occurring between teeth 11 and teeth 13. Backlash or oscillating movement of hub 12 or shaft 10 relative to each other is thereby prevented.

From the above it will be apparent that the present invention provides a new and improved splined shaft and gear structure wherein noise producing backlash or oscillation has been eliminated. By a simple and effective means comprising the ball 35 yieldably engaged between two splined teeth, production clearances may be maintained and yet noise will be eliminated when the structure including gear 22 and hub 12 is rotating under "no load." Equivalent structures to balls 35 may be utilized to eliminate relative oscillation between members 12 and 22. For example a spring urged projection comprising a cylindrical member having a semispherical end portion to engage between teeth 23 could be utilized. Further, the mechanism 21-35-36 could be mounted in member 22 with balls 35 yieldably engaged between teeth 20 on hub 12 to provide a noise-free structure equivalent to that described above.

Various features of the invention have been particularly shown and described; however, it should be obvious to one skilled in the art that various modifications may be made therein without departing from the scope of the invention.

We claim:
1. In a torque transmitting mechanism, a hub member having external spline teeth, an axially slidable torque transmitting member having a bore therein and encircling said hub member, said bore having internal spline teeth, said internal and external spline teeth being enmeshed to provide a torque transmitting connection between said member and said hub, means on one of said members yieldably engaged between two of said teeth on said other member to prevent oscillation of one member with respect to the other, and including a clearance provided between the enmeshed internal and external teeth whereby said means is operative to center the teeth of one member with respect to the teeth on the other.

2. A torque transmitting mechanism as claimed in claim 1 wherein said means includes at least one ball and a spring urging said ball into engagement with said teeth.

3. A torque transmitting mechanism as claimed in claim 2 wherein said ball and spring are mounted in said hub member and said ball engages between two of the internal spline teeth on said axially slidable member to prevent oscillation of said axially slidable member with respect to said hub member.

References Cited

UNITED STATES PATENTS

| | | | |
|---|---|---|---|
| 1,611,608 | 12/1926 | Psilandee | 64—6 |
| 2,696,124 | 12/1954 | Flowers et al. | 64—27 |
| 2,800,800 | 7/1957 | Dunn | 74—325 |
| 2,896,760 | 7/1959 | Hebbinghauss | 192—53 |
| 2,961,856 | 11/1960 | Selzer | 64—27 |
| 3,222,772 | 12/1965 | Leyner | 64—27 |

FOREIGN PATENTS 977,883　12/1964　Great Britain.

HALL C. COE, *Primary Examiner.*